United States Patent [19]

Kosednar et al.

[11] Patent Number: 4,711,993
[45] Date of Patent: Dec. 8, 1987

[54] FRAUD-RESISTANT MANUAL MAGNETIC READER-WRITER SYSTEM FOR DEBIT CARD USE

[76] Inventors: Joseph F. Kosednar, 2030 Seven Pines Dr., Creve Coeur, Mo. 63041; Merlyn W. Barth, 729 W. Lockwood, Glendale, Mo. 63122

[21] Appl. No.: 736,113

[22] Filed: May 20, 1985

Related U.S. Application Data

[63] Continuation-in-part of Ser. No. 568,384, Jan. 5, 1984, Pat. No. 4,599,510.

[51] Int. Cl.$^4$ .............................................. G06K 5/00
[52] U.S. Cl. .................................... 235/380; 235/449; 235/480; 235/482; 235/437
[58] Field of Search ............... 235/437, 449, 482, 480, 235/380

[56] References Cited

U.S. PATENT DOCUMENTS

| | | | |
|---|---|---|---|
| 4,146,174 | 3/1979 | Darjany et al. | 235/482 X |
| 4,228,348 | 10/1980 | Lee | 235/449 |
| 4,322,613 | 3/1982 | Oldenkamp | 235/437 X |
| 4,513,199 | 4/1985 | Sidline | 235/449 |
| 4,593,328 | 6/1986 | Baus | 235/482 X |

*Primary Examiner*—David L. Trafton
*Attorney, Agent, or Firm*—Jerome A. Gross

[57] ABSTRACT

A fraud-resistant manually-fed reader-writer is especially suited for debit card use, in which a credit balance is read into the memory of the reader. When the card reaches the end of its insertion-reading movement, a validity indication encoded on the magnetic stripe of such card is automatically eradicated by energizing a de-gaussing coil. If, after effecting transactions which debit the memory, the card is removed by some artifice without re-writing it with a reduced balance, such removed card will lack a validity indication and hence be incapable of re-use. Provisions are made to time the re-writing and to avoid forfeiture of the balance if the card should be withdrawn too slowly or too rapidly.

11 Claims, 4 Drawing Figures

FRAUD-RESISTANT MANUAL MAGNETIC READER-WRITER SYSTEM FOR DEBIT CARD USE

CROSS-REFERENCE TO RELATED APPLICATIONS

This application is a continuation-in-part of pending Application Ser. No. 06/568,384 filed Jan. 5, 1984, now U.S. Pat. No. 4,599,510, entitled "Vibration-Minimizing Magnetic Card Reader."

TECHNICAL FIELD

This invention relates to manual-fed reader-writers and magnetic cards therefor, particularly those encoded with a

BACKGROUND ART

Debit cards are currently in use for the operation of vending machines and the like, frequently in substitution for coin operated machines. Cards bearing a magnetic stripe, previously encoded with a starting credit balance, are inserted in such machines and successively debited as each transaction is made. The starting credit balance is read from the card as it is inserted into the reader-writer, whose microprocessor interprets and verifies the reading. The balance so read is displayed visually. The microprocessor of the reader-writer then successively debits the displayed balance as purchases or other debiting transactions are made. When desired transactions have been completed, the card is rewritten, as it exits from the reader-writer, with the new credit balance from the microprocessor memory, and the memory is canceled.

Such automated systems seem inherently to challenge persons to fraudulent trickery. Manually operated card reader-writers, in which the user inserts the card only partially, leaving a part of it exposed for withdrawal, are particularly subject to such fraudulent use. One wholly obvious manner of fraudulent use which might be feasible, would be to utilize the card to effect a series of transactions which debit substantially its entire credit amount, then to disconnect the power to the machine, then to withdraw the card with the encoding of its original credit balance undiminished. There are several less obvious procedures by which such fraudulent use has sometimes been effected; it would be inappropriate in this specification to teach such procedures.

Such problems are largely avoided in motor driven card readers, which draw the card entirely into the machine and beyond the reach of the user. After the credit amount of the card has been read into the memory of the machine, the motor subjects the card to a reversing movement on which the magnetic head erases the credit amount, all before any debit transactions are enabled.

DISCLOSURE OF THE INVENTION

The principal object of the invention is to provide a system of apparatus and method, enabling a magnetic card reader-writer which is hand fed, not motorized, to avoid such fraudulent misuse. A further object is to make provision for manual withdrawal of the card over a wide range of acceptable speed of movements; and to assure the user against failure in rewriting his credit balance even when he moves the card at a speed not within such acceptable range. Other objects will appear from the balance of this specification.

Summarized for purpose of easy understanding and without limiting the scope of the invention, we here provide a system and apparatus by which cards are encoded not only with credit data, along with other conventional identification and security data, but also with a validity indication or indications, normally encoded in a validity field spaced physically apart from the credit data and adjacent to that edge of the card which will last leave the machine on withdrawal movement. Thus, in the machine into which the card is inserted against a stop and subsequently withdrawn by reverse movement, such validity indication would be encoded on the leading edge of the card as it enters the machine. As the stripe passes the magnetic head used for both reading and writing, it is read completely into memory. As the card reaches a stop at the end of its path, it encounters a sensor which actuates conventional circuitry to verify the existence and acceptability of the validity indication so encoded on its leading edge. The circuitry then actuates a de-gaussing coil or other electromagnetic erase means located adjacent to the validity field of the card. On eradication of the validity indication, the circuitry is ready to accept a succession of debit transactions up to the credit amount so read into memory, the display successively showing the new credit balance after each such transaction.

Since the original credit balance encoded on the card has not yet been modified, if the user now managed to trick the machine by removing the card with its original credit balance, the card nevertheless could not be inserted into a different machine for reuse, because of its lack of validity indication.

It is possible that factors not involving fraud (for instance, card withdrawal at a speed outside an acceptable range) may sometimes interfere with rewriting a true credit balance. According to the present invention, if a rewriting acceptability test is not met, the validity indication is not rewritten, and the user is notified of such failure to rewrite. Meantime both the revised credit balance and the validity indication are held stored in memory. Hence, the user may re-insert the card and, on withdrawing it at an acceptable rate, the credit balance, as well as the validity indication, will be rewritten on his card and the storage then cleared.

The present apparatus is adapted, for easy manufacture as two separate assemblies. A first assembly is primarily mechanical, consisting of supporting side plates which define the width of a planar card path, and support on cross-shafts such elements as a rubber anvil roll, rotatable pulse interruptor or timing mechanism, and switch bell-cranks, a front plate with card slot and display window, the horizontal card slide in which the read-write head and the de-gaussing coil are embedded. Above this assembly, and supported by its side plates, is a circuit board bearing an electronic assembly including not only a microprocessor but also several downward-projecting elements, including the electronic display behind the display window, electrical switches operated by the bell-cranks of the mechanism assembly below, and a photo-electric switch which spans the edge of the rotatable interruptor element. On mating these assemblies, no electrical connections are required except those from the microprocessor to the reader-writer head and to the de-gaussing coil.

THE DRAWINGS

BEST MODE FOR CARRYING OUT THE INVENTION

Figure 2:
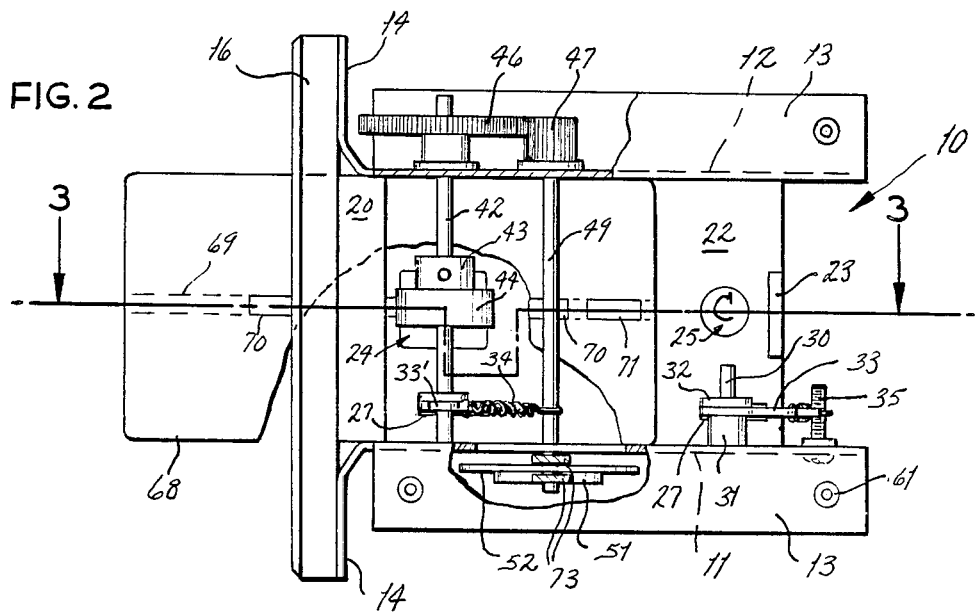
FIG. 2 is a plan view of the mechanical assembly only of FIG. 1 (the circuit board assembly being removed) showing a magnetic card partially inserted.

Referring first to the mechanical assembly as generally designated 10 in FIG. 2, its structural elements include a metal right side frame 11 and a generally similar left side frame 12, each having upper and lower horizontal flanges 13 bent outwardly. The forward ends of the right and left side frames 11, 12 continue in outwardly bent front end flanges 14, to which are secured a heavy metal front plate 16 which may be formed by casting. The plate 16 has an upper display opening 17, best seen in FIG. 3, in which is mounted a glass window 18. The front plate 16 further has a lower horizontal card slot 19 which in the preferred embodiment terminates in an upper rearwardly-directed spacing lip 20, which not only insures the substantially horizontal insertion of a magnetic card but whose width, best seen in FIG. 2, securely fixes the spacing of the metal side plates 11, 12 above the level at which the card is to be inserted.

Figure 1:
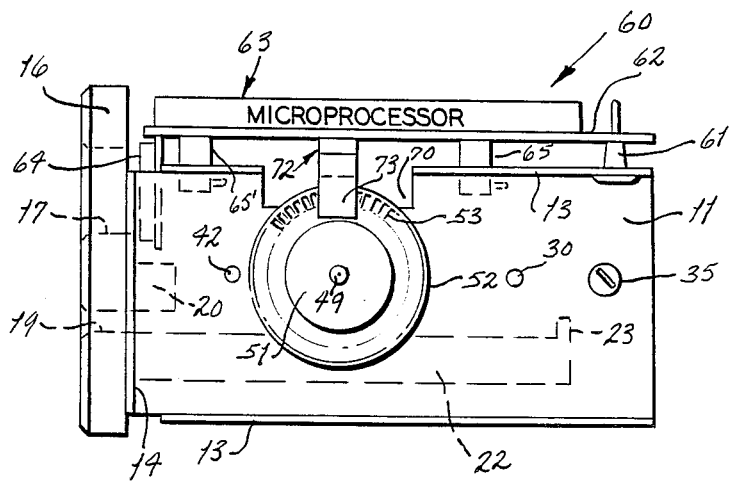
FIG. 1 is a right side view of a magnetic card reader-writer embodying the present invention.

Continuing aft from the lower margin of the card slot 19, secured between the side frames 11, 12 is a planar bed 22, rectangular in form as best seen in FIG. 1, along which an inserted card is to slide. Conveniently the planar bed may be formed of plastic material. At its rear end, seen best in FIG. 3, is provided a raised card stop 23 which may be integral.

Shown substantially midway between the left and right side frames 11 along the line indicated by the section line 3—3 of FIG. 2 (except where same is broken back to show the detail of FIG. 3) there is embedded in the planar bed 22, along its upper surface, a read-write head generally designated 24, closely aft of the spacing lip 20. Therebeyond, closely forward of the card stop 23 is similarly embedded a de-gaussing coil 25, marked "C" in FIG. 2. The functions of these will be referred to more fully hereafter.

Figure 3:
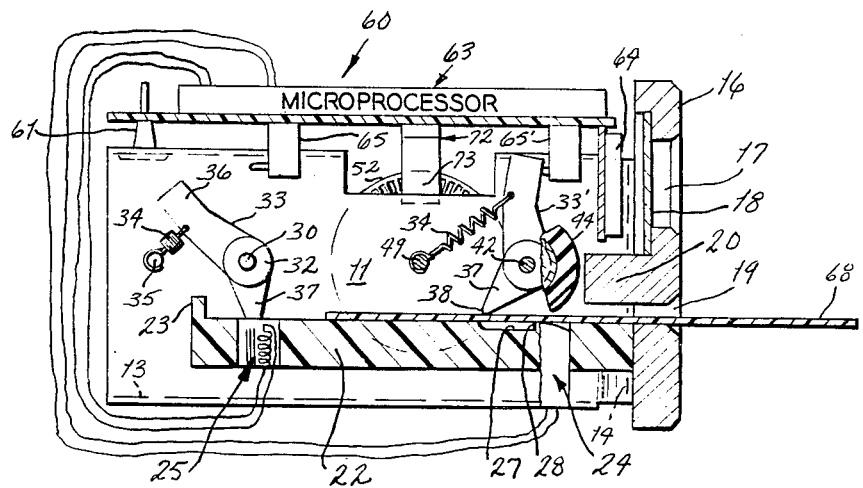
FIG. 3 is a sectional view taken along line 3—3 of FIG. 2 showing the electronic circuit board assembly in place, with its display and electrical switch elements positioned to act with the assembly of FIG. 2.

Formed in the planar bed 22, spaced inwardly from the right side frame 11, are forward and rear bell-crank grooves 27, the forward groove being best.seen in the broken section portion of FIG. 3. Each of the bell-crank grooves 27 has a forward stop edge 28, utilized in a manner hereafter described.

On a horizontal stub shaft 30 secured to the right side frame 11, and mounted between a spacer 31 and a washer 32, is a rear switch bell-crank 33, seen in FIG. 3 in switch-open position and biased to that position by a rearward-extending tension spring 34 mounted on any convenient element, in this case a screw 35 extending horizontally inward from the side plate 11. The upper arm 36 of the bell-crank 33 is referred to as its switch-engaging arm; while its lower arm 37 is referred to as its trailing arm, because it trails aft when engaged by a credit card. The lower trailing arm 37 terminates in a tip 38 which, in the switch-open position shown in FIG. 3, brings it below the surface of the planar bed 22 into the bed groove 27 and against its forward stop edge 28. Because of the manner in which the cross section in FIG. 3 is taken through the de-gaussing coil "C," reference is made to the FIG. 3 showing of the same elements shown for the forward switch bell-crank 33' A second rearward tension spring 34 connects the upper arm of this forward bell-crank 33' to a timer-cross shaft, hereinafter described.

The forward switch bell-crank 33' is freely mounted on a rotatable anvil cross shaft 42 supported by the side frames 11, 12, transverse to the card path along the bed 22 defined by these frames. On the shaft 42, secured by a metal hub 43, is a rubber or rubber-like resilient anvil wheel 44 which meets the read-write head 24 at the level of the upper surface of the planar bed 22. Outwardly of the left side frame 12, on the shaft 42 is mounted a relatively large gear 46, in mesh with a spur gear 47 secured to a timing wheel cross-shaft 49 aft of the anvil shaft 42. The spring 34 which biases the forward bell-crank 33' to switch-open position is shown secured onto the cross-shaft 49. At that end of the timer wheel cross-shaft 49 which extends through and beyond the right side frame 11, mounted by a hub 51, is a conventional photo-electric timer wheel 52 best seen in FIG. 1. It has, along its perimeter, a series of evenly spaced opaque and transparent areas 53, to provide timed interruption and thereby effect timing pulses for re-writing a magnetic card, as hereafter described.

A second principal assembly is referred to as the electronic assembly generally designated 60, seen in FIGS. 1 and 3. On upstanding shoulders of plastic studs 61 mounted at the corners of the upper flanges of the side frames 11, 12 (for simplicity only one of such studs 61 is shown in each of FIGS. 1 and 3) is a circuit board 62, of conventional construction and design as dictated by the choices of the designer. It bears a microprocessor generally designated 63 and such cooperating conventional electronic elements as may be chosen by the designer for the particular circuitry he chooses to utilize. Along the forward edge of the circuit board 62, which when in place is immediately aft of the front plate 16, there is mounted an electronic alpha-numeric display 64, to project downwardly immediately behind the display window opening 17. Likewise mounted on the circuit board 62 to project downward, positioned inward of the side plate 11 and aligned with the bell-cranks 33 and 33', are electrical switches, the rear switch being designated 65 and referred to, in the functional disclosure which follows, as the "second sensor," and the forward switch 65', referred to as the "first sensor." When a credit card 68 is inserted as shown in FIGS. 2 and 3, with its magnetic stripe 69 aligned for reading by the reading head 24, the card 68 strikes the tip 38 of the lower trailing arm 37 of the forward bell-crank 33' and cams it upward to trail aft. This causes the bell-crank upward-extending arm 36 to engage the switch 65', or first sensor, as seen in FIG. 3. When on continued movement the card 68 approaches the stop 23, it similarly engages the aft bell-crank 33, so that its upward arm 36 engages the second sensor or switch 65. While for practical purposes the magnetic stripe 69 will extend the entire length of the card 68, with the insert-withdraw type card reader shown, some portion of the card must necessarily project when it has been fully inserted against the stop 23. Also, it is deemed advantageous to have only the validity indication eradicated when the de-gaussing coil 25 is operated. Accordingly the card areas used for encoding are in effect divided into separate, spaced apart fields, the data field 70 and the validity field 71 seen in FIG. 2.

Also projecting downward from the circuit board 62, through a gap in the flange and upper portion of the right side plate 11, is a photo-electric switch generally designated 72 having emitter and receiving elements 73, as shown in dashed lines in FIG. 2, spanning the opaque and transparent areas 53 along the perimeter of the timer wheel 52. The photo-electric switch 72 thus functions conventionally to provide timed interruptions, and thereby current pulses, at a rate proportionate to the rate of rotation of the anvil wheel 44 as the magnetic card 68 is withdrawn. These pulses are used to time the writing out from memory, as hereafter described. The acceptability of the rate at which such writing out is pulsed—that is, whether the writing-out is either within or outside the speed range at which the circuitry can operate with reliability—is monitored by clock circuitry within the microprocessor 60.

With the construction described, no electrical connections need be made from the circuit board 62 and its microprocessor 63 except to the read-write head 24 and the de-gaussing coil 25.

Figure 4:
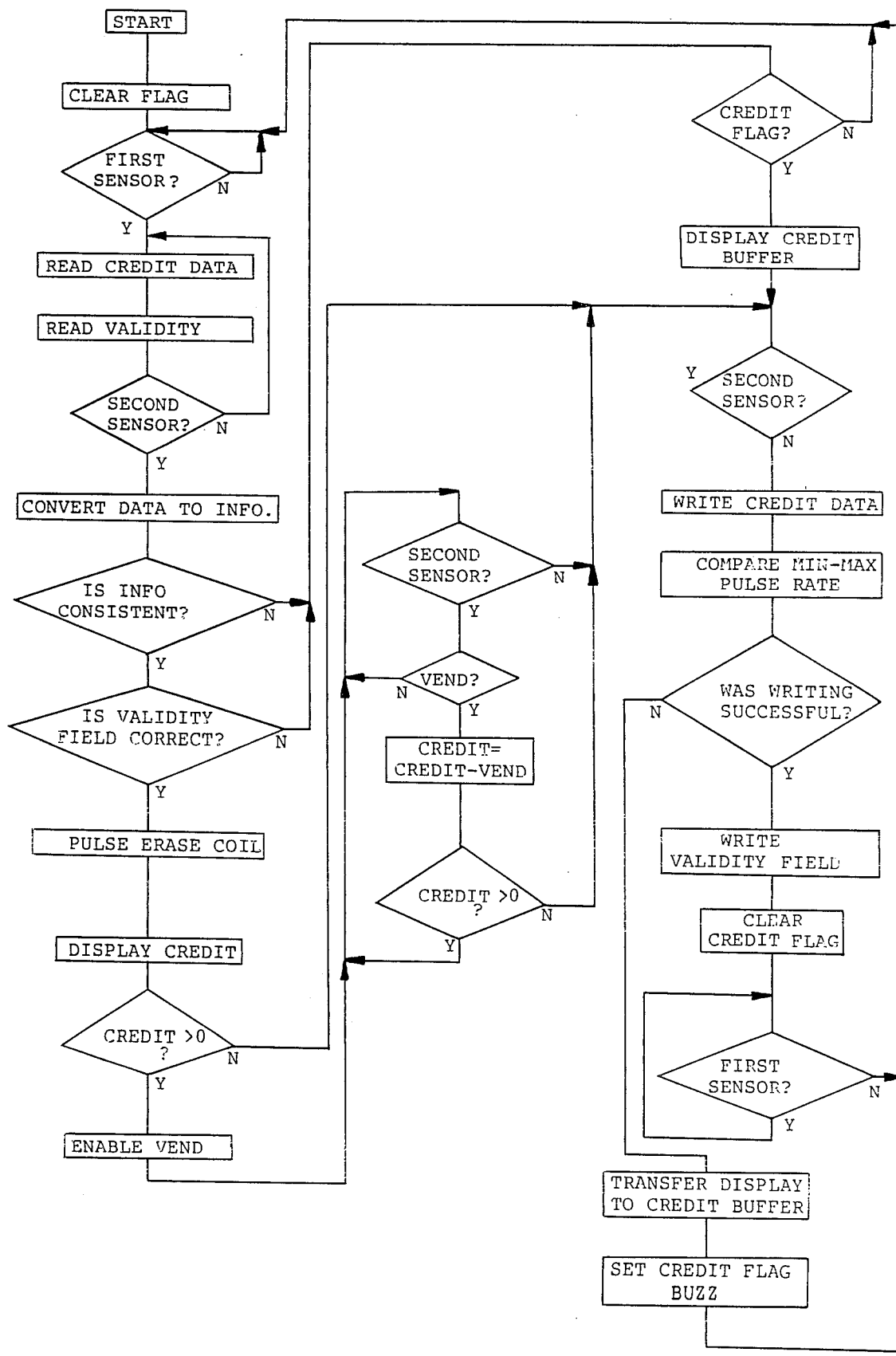
FIG. 4 is a chart showing the sequential flow of operations of the present process

The flow chart, FIG. 4, illustrates the logic of the microprocessor 60; from this chart, the detailed programming of the circuitry will be apparent. As to each question in the flow chart, "Y" means yes and "N" means no.

At inception, (for example, when first connected) the circuitry clears any "credit flag", as hereafter explained, and checks whether the first sensor 65' is occupied; if no, the circuitry waits until this sensor is occupied by insertion of a magnetic card 68. On receiving a "first sensor occupied" signal, the circuitry connects the read-write head 24 for successively reading the data field 70 and the validity field 71, as the anvil 44 presses resiliently against the head 24. This "read" status is terminated when the second sensor 65 shows the presence of the card 68.

The microprocessor 68 then converts the read data into understandable form (referred to in the flow chart as "INFO"). It then compares that "INFO" read from the data field 70 to such standards as the circuitry may establish for determining whether the data is acceptable ("CORRECT") or inconsistent; if acceptable it then compares the validity field reading to determine whether it also is acceptable. If either determination is "NO" the operations proceed as shown in the upper right hand corner of the flow chart, FIG. 4, subsequently explained.

Assuming that both the reading of the data field 70 and validity field 71 are acceptable, the following novel step is carried out—the de-gaussing coil 25, also designated "C," is pulsed, creating such a magnetic field as will eradicate the data encoded in the adjacent validity field 71 of the card 68. The amount of credit read from the data field 69 is then displayed. If the credit should be zero, the operation is transferred to below the second item in the right hand column of FIG. 4. However, assuming there is a credit, the circuitry enables a vend operation, as seen in the second column of FIG. 4.

Vend operations are dependent upon the continued occupation by the card 68 of the second sensor 65; should the card be withdrawn the operation proceeds as shown to the third column of FIG. 4. Assuming the card 68 is left in place, the user selects a "VEND" for a chosen amount. In the "VEND ?" step shown on the flow chart, the microprocessor checks whether the amount of credit is sufficient to permit the chosen vend operation. If so, the vend proceeds, the microprocessor subtracting the amount of the vend to obtain a new credit amount. The apparatus remains in the vend state until, on successive vends, the credit amount no longer exceeds zero, or until the second sensor is no longer occupied—that is, when the user commences to withdraw the card.

Referring to the right hand column of FIG. 4, starting with the third item, withdrawal movement of the card 68 from the second sensor 65 engages the "write" circuitry and effects writing on the card of the data retained in memory as originally read from the data field 70, with the credit amount reduced by the amount of such vends. As this data is rewritten on the data field, the writing card movement rotates the rubber anvil wheel 44 and its shaft 42, at a speed corresponding to the linear speed of withdrawal of the card. Due to the gearing 46, 47, the timing wheel 52 rotates at a faster speed precisely proportionate to the withdrawal rate. Timing pulses so delivered by the photo-electric switch 72 to the microprocessor direct the encoding by the read-write head 24 of each successive bit of data. The data field 70 will thus be re-encoded over substantially the same length of the magnetic stripe 69 as its original encoding, whether the card be withdrawn guickly or slowly. Obtaining these timing pulses at a rate proportionate at all times to the rate of card movement at the writing head itself, is a factor which assures an accurate comparison to a practical standard as follows:

Practical design problems of any such electronic system require that the encoding rate cannot be extremely slow or extremely fast, but must fall within some feasible minimum-to-maximum range. For this purpose, the rate of pulse generation by the timer wheel 52 is compared with clock timer circuitry of the microprocessor, as previously mentioned. If the rate of encoding is found to be within this practical range, the writing of the data field 70 is determined to be "successful", and continued movement permits writing the validity field. Any pre-existing "credit flag," as hereafter explained, is then cleared, and continued movement of the card to vacate the first sensor restores the circuitry for an entirely new operation.

If however the rate of rewriting was not within the minimum-to-maximum range, and was therefore found not to be "successful", the amount of remaining credit is transferred to a credit buffer. A marker is set in the circuitry to hold this credit; such marker is referred to as a "credit flag" (which terminology does not imply any visual indication). The user who has withdrawn his card at an acceptable rate is notified, however, that there is a credit due him by a three-second buzzing and/or other selected signal of the display 64.

If the user now reinserts the card, it will pass through the reading stages shown in the first column of FIG. 4 to the stages designated "IS INFO CONSISTENT?" and "IS VALIDITY FIELD CORRECT?". Since the re-inserted card has no writing in its validity field, this having been originally eradicated by the de-gaussing coil and never re-encoded, the operation proceeds as shown at the top of the right hand column of FIG. 4. The credit flag having been set in the circuitry when the user withdrew his card at an unacceptable rate, the amount of his credit is now displayed; and when he again withdraws the card from the second sensor, the writing operation proceeds, so that if the data writing is now "successful" the validity field will be rewritten, and the credit flag cleared; and as the card is withdrawn from the first sensor the circuitry is prepared for a subsequent operation.

The method and principal elements of apparatus of the present invention may be used in other embodiments; for example, a swipe-type card reader-writer may be utilized. With this type of reader-writer, a card is moved in a single direction only along a linear path which has essentially two portions, one for reading and the second for writing, each equipped with a separate head. Instead of using a stop 23 as shown in FIG. 2 of the drawing which ends the path of insertion, the swipe-type reader may be equipped with any other means to establish a rest position for the card between such first and second co-linear portions. Other obvious requirements would be as follows: a third position sensor, at the outlet of the swipe reader, would be used to show the complete withdrawal of the card, instead of the reuse of the first sensor 65'; the de-gaussing coil would be located so as to be adjacent to the trailing edge of the card when in such rest position; and the validity field would likewise be near the trailing edge of the card, so that the validity field would be the last to be rewritten, after the successful writing of the credit data, as the card is withdrawn out of the rest position. With such changes, which will be apparent to those skilled in the art, the swipe-type reader, with its separate reading and writing heads, would be adapted to carry out the present invention. However, for simplicity, the insert-withdraw type, as shown in the preferred embodiment, is deemed by the Applicants to be preferable, except where the amount of information to be encoded exceeds the capacity of that portion of magnetic stripe length which can be used in the insert-withdraw type.

While a de-gaussing coil has been shown as the preferred means to eradicate, other means to erase or eradicate may be used; for example, a permanent magnet might be electromagnetically released to contact and thereby erase the validity field. The terms "erase" or "eradicate" should herein be construed broadly to mean any change which makes impossible the reading as originally encoded. Further, the encoding of a validity indication may be as simple or complex as desired, so long as it will be read as differing from whatever indication is left by the erase or eradicate means.

INDUSTRIAL APPLICABILITY

The principal field of use contemplated for the present invention is in manually-fed reader-writers for cards magnetically encoded with a credit balance, to be debited when used for successive vend transactions, or the like.

The embodiments of the inven in which an exclusive property or privilege is claimed are defined as follows:

1. For accepting commands for transactions involving debiting the amount of credit encoded on a magnetic stripe card which if valid is also encoded with a validity indication,
    a manual card reader-writer comprising
    means to establish a linear path for card insertion and reading, and a co-linear path for card writing and withdrawal,
    means to fix a rest position at the end of such card reading path,
    card sensor means to respond when such card has reached such rest position,
    means including card read head means, effective on card movement along such path for insertion, to read and store in memory such credit amount and such validity indication, if the latter be present,
    means, effective on such response of the card sensor means and on completion of such storage in memory, to eradicate at least such validity indication,
    means to output from memory and display at least the credit amount so read and stored,
    means to receive an external command to debit such credit amount, and to accept such command if not in excess of the credit amount then present and if such a validity indication has been stored, and to calculate a revised credit balance effective on such acceptance and to substitute same in the storage and display, and
    means including card write head means, effective on withdrawal movement of such card out of said rest position and along said write path, to recall out of storage such credit balance as revised and write same on such card in place of the original credit amount, and thereafter, if a validity indication has been so stored, to rewrite such stored validity indication and cancel all such storage,
    whereby should a user manage to remove a card without rewriting its credit balance out of storage, such card would lack a validity indication and be incapable of reuse.

2. A manual card reader-writer as defined in claim 1, together with
    means, effective after rewriting the credit balance but prior to rewriting such stored validity indication, to compare such credit balance writing with an acceptable standard for writing, and to then rewrite the validity indication and cancel the storage only if such credit balance writing has met such acceptable standard,
    whereby on subsequent reinsertion of such card having no rewritten validity indication, a following withdrawal movement again writes such credit balance out of storage, and if on such comparison, such rewriting meets such standard, the validity indication will then be rewritten on such card, thus restoring its capability for reuse, and all such storage will be cancelled.

3. A manual card reader-writer as defined in claim 1, wherein
    said means to fix a rest position is a stop which terminates the linear path for qard insertion, and
    the path for card writing and withdrawal is the reverse of such path for card insertion and reading, and
    the card read head means serves also as the card write head means.

4. The card reader-writer as defined in claim 1, wherein
    the said means to eradicate is a de-gaussing coil.

5. The card reader-writer as defined in claim 1, wherein
    said means to eradicate is located adjacent to that edge of such magnetic stripe card, when in rest position, which will last pass the write head means on card withdrawal,
    whereby, if such a validity indication is encoded adjacent to such card edge and spaced from the encoding of the credit amount, only the validity indication will be eradicated by said eradicate means.

6. A manual card reader-writer as defined in claim 1, wherein said means to recall and rewrite out of storage includes means, including a resilient rotatable wheel, opposite said card write head means, adopted to bear against such card surface on card withdrawal movement, to generate rewrite-timing pulses, whereby the rate of such writing is timed proportionatel to the speed of card withdrawal.

7. A manual card reader-writer as defined in claim 6, together with means to compare the rewrite timing pulses so generated with an acceptable clock rate range, and means to stop such rewriting, prior to and without the writing of such validity indication and the cancellation of storage, should such comparison indicate that the rate of timing pulses so generated falls outside such acceptable clock rate range, whereby a card removed at an unacceptable speed, and thus without a validity indication rewritten thereon, may be reinserted and substantially removed at a speed which, if found acceptable on such comparison, will then cause the reencoding of such validity indication and the cancellation of storage.

8. For use with a card having an encoded magnetic stripe, manually operated magnetic card reader-writer comprising (A) a first assembly including means to establish a planar path for insertion and withdrawal of such a card, stop means at the end of said path, a pair of side plates defining the width of said path, front plate means supported by and transverse to said side plates, said front plate means including a card slot at the level of said planar path and a display window thereabove, a magnetic reader-writer head in said planar path adjacent to said front plate, a rubber-like anvil wheel positioned opposite to said reader-writer head and secured to a cross shaft mounted to said side plates above said planar path, whereby the anvil wheel is rotatable in a plane perpendicular to said path, means, rotatable in such a perpendicular plane and driven by said anvil wheel, a first bell-crank switch lever mounted about a pivot point and thereby positioned adjacent to said front plate and movable angularly in such a perpendicular plane, said switch lever including a first lever arm which, when the switch lever is biased, extends downwardly and across said planar path trailingly relative to the direction of movement of a magnetic card when inserted along such planar path, said bell crank switch lever having a second lever arm extending upward, and a second similarly constructed bell crank switch lever similarly mounted about a pivot point adjacent to said stop means, in combination with (B) a second assembly comprising a circuit board mounted by and above said first assembly, said circuit board having mounted thereon downward-projecting electronic display means positioned adjacent to and inward of the window of said front plate, a downward-projecting forward switch so positioned as to be operated by the second arm of said first bell crank switch lever when said lever is moved similarly from such biased position, a similar downward projecting rear switch so positioned as to be operated by similar movement of said second bell crank switch lever, means projecting downward alongside said interruptor means, to provide electrical timing pulses responsive to the rotation of said pulse interruptor means, and microprocessor means operatively connected to each of said means which so project downward from said circuit board, said microprocessor means including a memory wherein is stored the reading of a magnetic stripe card by the read-write head of said first assembly, such reading being initiated when said first switch is so operated on insertion of such card and being terminated when such second switch is operated, and from which memory information is magnetically written out by said read-write head, commencing and withdrawal of such card from said second switch and ceasing on withdrawal thereof from such first switch, at a rate timed by said electrical timing pulses, whereby said first assembly and said second assembly may be readily manufactured as separate units, together with (C) electrical connections between the microprocessor means of said second assembly and the reader-writer head of said first assembly.

9. The manually operated magnetic card reader-writer as defined in claim 8, wherein said first assembly further includes a de-gaussing coil in said planar path adjacent to said stop means, and wherein further electrical connections are provided between said microprocessor and said de-gaussing coil, whereby after completion of such reading into memory, said microprocessor actuates said de-gaussing coil, thereby to eradicate from the magnetic stripe of such card the information as may have been encoded on that portion thereof adjacent to said de-gaussing coil.

10. The method of using a magnetic stripe card and a manual card reader-writer to avoid fraud, comprising the steps of (a) encoding the credit card with a credit amount and also a validity indication, (b) then inserting the card into such reader-writer so that its magnetic stripe is read into memory by a reading head, (c) then sensing that the card has been fully inserted and read, and on such determination, eradicating from the card at least the validity indication, (d) thereafter, displaying the amount of credit as read from the card, permitting execution of commands which call for debiting up to the credit amount so in memory, and simultaneously revising and displaying the new balance thereof, (e) then withdrawing the card past the write head and thereby writing on the card the revised credit balance, (f) then, as such withdrawing continues, rewriting a validity indication, and (g) deleting from memory such revised debit balance and validity indication.

11. The method as defined in claim 10, together with the intermediate step, following step (e) thereof, of comparing such writing of the revised credit balance with a standard of acceptability, and if such writing meets such standard of acceptability, then proceeding with said steps (f) and (g), but if said credit balance rewriting fails to meet said standard, then taking the additional steps of reinserting the card, then withdrawing it so as to again rewrite the credit balance, then comparing such rewriting with such standard of acceptability, and if such standard is then met,
then proceeding with said steps (f) and (g).

* * * * *

UNITED STATES PATENT AND TRADEMARK OFFICE
CERTIFICATE OF CORRECTION

PATENT NO. : 4,711,993

DATED : December 8, 1987

INVENTOR(S) : Joseph F. Kosednar and Merlyn W. Barth

It is certified that error appears in the above-identified patent and that said Letters Patent is hereby corrected as shown below:

In Column 1, line 17, please insert at the end of the sentence after the words "with a" the words ---credit balance for debiting as transactions are carried out.---

In Column 3, line 14, insert ---.--- after the word "process".

In Column 6, line 28, delete "guickly" and substitute ---quickly---.

In Column 7, line 55, delete "inven" and substitute ---invention---.

In Column 8, line 49, delete "qard" and substitute ---card---.

In Column 9, line 9, delete "tionatel" and substitute ---tionately---.

Signed and Sealed this

Third Day of May, 1988

Attest:

DONALD J. QUIGG

*Attesting Officer*     Commissioner of Patents and Trademarks